United States Patent [19]

Morse

[11] Patent Number: 4,925,568

[45] Date of Patent: May 15, 1990

[54] POLYACRYLATE BLENDS AS BOILER SCALE INHIBITORS

[75] Inventor: Lewis D. Morse, Pittsburgh, Pa.

[73] Assignee: Calgon Corporation, Pittsburgh, Pa.

[21] Appl. No.: 313,405

[22] Filed: Feb. 21, 1989

Related U.S. Application Data

[63] Continuation of Ser. No. 122,988, Nov. 19, 1987, abandoned, which is a continuation of Ser. No. 897,189, Aug. 15, 1986, abandoned.

[51] Int. Cl.$^5$ ................................................ C02F 5/10
[52] U.S. Cl. .................................... 210/701; 252/180
[58] Field of Search ............................. 210/698–701; 252/180, 181

[56] References Cited

U.S. PATENT DOCUMENTS

| | | | |
|---|---|---|---|
| 3,514,376 | 5/1970 | Salutsky | 203/7 |
| 3,578,589 | 5/1971 | Hwa et al. | 210/701 |
| 3,617,577 | 11/1971 | King | 252/181 |
| 3,658,710 | 4/1972 | Puckorius et al. | 210/698 |
| 3,663,448 | 5/1972 | Ralston | 252/180 |
| 3,706,717 | 12/1972 | Siegele | 252/180 |
| 3,709,816 | 1/1973 | Walker et al. | 210/701 |
| 3,791,978 | 2/1974 | Krueger et al. | 252/180 |
| 3,890,228 | 6/1975 | Hwa et al. | 252/180 |
| 3,928,196 | 12/1975 | Persinski et al. | 210/701 |
| 3,941,562 | 3/1976 | Hollingshad | 422/16 |
| 3,959,167 | 5/1976 | Hwa et al. | 252/180 |
| 3,992,318 | 11/1976 | Gaupp et al. | 252/181 |
| 4,048,066 | 9/1977 | Cuisia et al. | 252/180 |
| 4,085,045 | 4/1978 | Song et al. | 210/701 |
| 4,175,100 | 11/1979 | Schiller et al. | 525/327 |
| 4,342,653 | 8/1982 | Halverson | 210/734 |
| 4,427,568 | 1/1984 | Snyder et al. | 252/180 |
| 4,457,847 | 6/1984 | Lorenc et al. | 210/698 |
| 4,499,002 | 2/1985 | Masler et al. | 252/180 |
| 4,502,978 | 3/1985 | Romberger et al. | 252/181 |
| 4,530,766 | 7/1985 | Hann et al. | 210/701 |

FOREIGN PATENT DOCUMENTS 89654 9/1983 European Pat. Off.

*Primary Examiner*—Peter Hruskoci
*Attorney, Agent, or Firm*—W. C. Mitchell; J. F. DiPrima

[57] ABSTRACT

A method of inhibiting scale in boilers is disclosed whereby high and low molecular weight blends of acrylic acid/acrylamide-type polymers are used to prevent boiler scaling. These polymer blends demonstrate synergistic hydrothermal stability and threshold scale inhibition characteristics at elevated temperatures and pressures.

1 Claim, No Drawings

POLYACRYLATE BLENDS AS BOILER SCALE INHIBITORS

This is a continuation of application Ser. No. 122,988, filed Nov. 19, 1987, now abandoned, which is a continuation of Ser. No. 897,189, filed on Aug. 15, 1986, now abandoned.

BACKGROUND OF THE INVENTION

This invention relates to a method of inhibiting scale formation and/or the formation of scale forming salts in boilers using a polymer admixture comprising polymers of different molecular weights. These synergistic polymer compositions are hydrothermally stable and provide improved threshold scale inhibition at elevated temperatures and pressures.

Certain types of water soluble polymers have been used in the past to fluidize precipitates, salts, or other solids which may be found in high temperature boiler water systems. For example, U.S. Pat. No. 3,630,937, entitled "Boiler Water Treatment", discloses the use of water soluble sulfonated polystyrenes, alone or in combination with other boiler chemicals. U.S. Pat. No. 2,783,200 discloses the use of certain polyacrylate compounds, and U.S. Pat. No. 3,514,376 discloses the use of short chain polyacrylic acid (molecular weight:5,000–13,000), to prevent scale formation in boilers and evaporators, respectively. U.S. Pat. No. 2,980,610 discloses the use of polyacrylamides for inhibiting the precipitation of calcium and other salts in boiler waters. Additionally, U.S. Pat. Nos. 3,709,815 and 3,928,196 disclose the use of polymers containing sulfonic acid and carboxylic acid moieties as scale inhibitors for aqueous systems.

Most industrial waters contain alkaline earth metal cations, such as calcium, barium, magnesium, etc. and several anions such as bicarbonate, carbonate, sulfate, oxylate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of calcium carbonate reaction products, a solid phase of calcium carbonate forms.

Solubility product concentrations are exceeded for various reasons, such as partial evaporation of the water phase, change of pH, pressure or temperature, and the introduction of additional ions which form insoluble compounds with the ions already present in solution. As these reaction products precipitate on surfaces of a water carrying system, they form scale or deposits. This accumulation prevents effective heat transfer, interferes with fluid flow, facilitates corrosive processes, and harbors bacteria. This scale is an expensive problem in many industrial applications, causing delays and shut downs for cleaning and removal.

The inventor has discovered that polymer blends comprising polymers of different molecular weights are synergistic with respect to both hydrothermal stability and threshold scale inhibition at elevated temperatures and pressures. The use of these novel polymer blends to treat boiler systems is unknown in the art.

DETAILED DESCRIPTION OF THE INVENTION

The instant invention is directed to a method of inhibiting the precipitation of scale forming salts in an aqueous boiler system comprising adding to said boiler system an effective amount of a composition comprising: (a) a polymer having a molecular weight of about 1,500 to about 3,000, as determined by gel permeation chromatography (GPC), selected from the group of polymers prepared using acrylic acid and methacrylic acid, alone or in combination with each other or with acrylamide and/or methacrylamide, and salts of these polymers; and (b) a polymer having a molecular weight of about 7,000 to about 15,000, as determined by GPC, selected from the group of polymers prepared using acrylic acid and methacrylic acid, alone or in combination with each other or with acrylamide and/or methacrylamide, and salts of these polymers; wherein the ratio of (a):(b) ranges from about 95:5 to about 5:95 by weight, and wherein the weight average molecular weight of said composition ranges from about 4,000 to about 7,000 preferably about 4,000 to about 6,000. Homopolymers of acrylamide and homopolymers of methacrylamide are not suitable for use in the instant polymer blends.

Additionally, the instant invention is directed to synergistic compositions for use as boiler scale inhibitors which comprise: (a) a polymer having a molecular weight of about 1,500 to about 3,000, as determined by GPC, selected from the group of polymers prepared using acrylic acid and methacrylic acid, alone or in combination with each other or with acrylamide and/or methacrylamide, and salts of these polymers; and (b) a polymer having a molecular weight of about 7,000 to about 15,000, as determined by GPC, selected from the group of polymers prepared using acrylic acid and methacrylic acid, alone or in combination with each other or with acrylamide and/or methacrylamide, and salts of these polymers; wherein the ratio of (a):(b) ranges from about 95:5 to about 5:95 by weight, and wherein the weight average molecular weight of said composition ranges from about 4,000 to about 7,000, preferably about 4,000 to about 6,000.

Thus, the inventor has discovered that specific blends of polymers having relatively low and high molecular weights synergistically prevent boiler scaling and are synergistically more hydrothermally stable than the individual polymers comprising the admixtures. These blends are also superior to homogeneous polymers having the same molecular weight as the weight average molecular weight of the blended compositions.

Any polymer prepared using monomers selected from the group consisting of acrylic acid and methacrylic acid, alone or in combination with each other, or in combination with acrylamide and/or methacrylamide, or in combination with and salts of these polymers, can be used. Thus, homopolymers of acrylic acid, homopolymers of methacrylic acid, copolymers of acrylic acid and methacrylic acid, copolymers of acrylic acid and methacrylamide or acrylamide, hydrolyzed polyacrylamides, copolymers of methacrylic acid and methacrylamide or acrylamide, terpolymers of any of these monomers, and salts of these polymers can be used.

Preferably, components (a) and (b) are polymers prepared from the same monomer(s), differing only in weight average molecular weight. However, compositions which comprise high and low molecular weight combinations of different polymers can also be used.

The preferred polymers for use in the instant compositions and method are homopolymers of acrylic acid and homopolymers of methacrylic acid, which are also referred to as polyacrylates and polymethacrylates, respectively. Homopolymers of acrylic acid are most preferred.

The polymer of component (a) should have a molecular weight ranging from about 1,500 to about 3,000, as determined by GPC. Preferably, the molecular weight should range from about 1,700 to about 2,500. The polymer of component (b) should have a molecular weight of about 7,000 to about 15,000, as determined by GPC, and the preferred molecular weight should be about 8,000 to about 10,000.

Any weight ratio of (a):(b) may be used. Preferably, however, the weight ratio of (a):(b) should range from about 95:5 to about 5:95, more preferably from about 75:25 to about 25:75 and most preferably from about 45:55 to about 55:45. Also, the weight average molecular weight of the total composition should range from about 4,000 to about 7,000, preferably from about 4,000 to about 6,000.

The instant compositions are stable to about 350° C. Thus, they may be used in boilers which operate up to approximately 2,350 psig. Preferably, these compositions are used in boilers which operate between 250° and 325° C., i.e. boilers which operate up to about 1,700 psig.

An effective amount of the instant blended compositions should be used. As used herein, the term "effective amount" refers to that amount of composition necessary to provide a scale inhibiting effect on the system being treated. The preferred dosage is from about 0.1 to about 1,000 mg/l, based on the aqueous system being treated. More preferably the dosage is about 0.5 mg/l to about 150 mg/l.

The key to this invention is that polymer blends which comprise polymers of low and high molecular weight are synergistically more thermally stable and better scale inhibitors than the individual polymers comprising the composition, or than a single, homogeneous polymer having a molecular weight similar to the weight average molecular weight of the polymer blend.

EXAMPLES

The following examples demonstrate the instant invention in greater detail. These examples should not, however, be viewed as limiting the invention in any way.

EXAMPLE 1

3.71 gms polyacrylic acid (23.7% active; molecular weight, Mw=2,768 as determined by GPC) were added to distilled water and 0.44 ml 10% aqueous $Na_3PO_4.12H_2O$. This produced 220.0 gms of a solution having a pH of 10.1 which contained 4,000 ppm polymer.

A 20 ml sample of the solution was obtained. The balance was poured into a 450 ml, glass-lined, 316 Stainless Steel Parr Reactor. Nitrogen gas at 10 psi was passed through the solution for 30 minutes to purge the system of air. The reactor was then sealed with 10 psi nitrogen in the head space.

The reactor was heated and reached 300° C. and 1280 psi in 64 minutes. A 20 ml sample was withdrawn ("O" time) via a sampling tube designed to operate without lowering the temperature or pressure. Additional 20 ml samples were taken ½, 1, 1½ and 2 hours after the "O" time sample was taken.

All samples were analyzed for polymeric carboxylic group content ($CA/CA_o$). This represents the fraction of carboxylic groups, based on the original carboxyl content. The method used was Calgon's Test No. 35-445-B, which is incorporated herein by reference. This test, which is available from Calgon, does not measure carboxyl groups of monomers or other low molecular weight materials.

The samples were also analyzed via gel permeation chromatography for surviving polymer mass ($m/m_o$). This represents the fractional mass, based on the original mass. GPC also provided the fractional molecular weight ($Mw/Mw_o$) based on the original molecular weight. Note that $Mw/Mw_o$ represents the fractional molecular weight of the surviving polymers. Thus, a polymer that has lost most of its mass can still show a high $Mw/Mw_o$.

The polymers were then evaluated for scale inhibiting properties. A test method entitled "Threshold Inhibition of Calcium Sulfate ($CaSO_4.2H_2O$) Laboratory Screening Test" was used (at pH 7 and 60° C. for 24 hours) to measure calcium sulfate inhibition. A test method entitled "Threshold Inhibition of Calcium Carbonate ($CaCO_3$) Laboratory Screening Test" was used (at pH 10 and 60° C. for 24 hours) to measure calcium carbonate inhibition. These test methods are available from Calgon Corporation and are incorporated herein by reference.

The results of these tests are shown in Table 1.

EXAMPLE 2

A 4,000 ppm solution at pH 10 was prepared, as in Example 1, using polyacrylic acid having a molecular weight (Mw) of 4,322. The system reached temperature in 63 minutes. Samples were withdrawn unheated and at 0, ½, 2 and 4 hours.

These samples were tested and evaluated as in Example 1, with the results shown in Table 1.

EXAMPLE 3

A 4,000 ppm solution was prepared, as in Example 2, using polyacrylic acid having a molecular weight (Mw) of 8,310. The system reached temperature in 59 minutes. Samples were taken at various intervals and tested as in Example 2, resulting in the data shown in Table 1.

EXAMPLE 4

As in Example 3, but using poly acrylic acid having a molecular weight of 14,238, the system reached temperature in 66 minutes. Samples were taken and tested as in Example 2, resulting in the data shown in Table 1.

EXAMPLE 5

The tests of Example 4 were repeated using a blend of 25 parts, on an active polymer basis, of polyacrylic acid having a molecular weight of 2,768 and 75 parts polyacrylic acid having a molecular weight (Mw) of 8,310. The system reached temperature in 61 minutes. Samples were taken before heating and after 2 hours and tested, resulting in the data shown in Table 1.

EXAMPLE 6

This example repeated the tests of Example 5, using 50 parts (Mw=2768) and 50 parts (Mw=8310). The system reach temperature in 60 minutes, and samples were taken before heating and after 2 and 4 hours resulting in the data shown in Table 1.

EXAMPLE 7

The tests of Example 2 were repeated, but the solution contained only 400 ppm polymer rather than 4,000 ppm. The results are shown in Table I for samples taken before heating, at T=0, and after 2 and 4 hours.

EXAMPLE 8

The tests of Example 6 were repeated, but the solution contained only 400 ppm polymer rather than 4,000 ppm. The resulting data is shown in Table 1.

Polymers exposed to 300° C. and 1280 psi for 2 hours and then tested at 1 ppm show consistently decreasing effectiveness as threshold inhibitors of calcium carbonate precipitation, and a drastic reduction at 2 and 4 ppm in effectiveness as calcium sulfate inhibitors, as the initial molecular weight of the polymers increases. Thus, while stability increases with polymer molecular weight, efficacy decreases.

Example 5

Example 5 shows that blending the polymers of Example 1 and Example 3, at a weight ratio of 25 parts to 75 parts, respectively, leads to decreased stability and less than optimal efficacy.

Example 6

Example 6 shows that blending of the two polymers used in Example 5, but at a weight ratio of 50 parts to 50 parts, leads to improved stability and improved efficacy.

TABLE 1

| Example No. | Description | Sample Time (hours) | Inhibition $CO_2$; 60° C.; pH 10 @ 0.5 | @ 0.1 | @ 1.5 | $SO_4$; 60° C.; pH 7 @ 2 | @ 4 | $Mw/Mw_o$ | $m/m_o$ | $Ca/Ca_o$ |
|---|---|---|---|---|---|---|---|---|---|---|
| 1 | Polyacrylic Acid $Mw = 2,768$ 4,000 ppm | Unheated | 76 | 97 | 100 | 35.2 | 97.6 | 1 | 1 | 1 |
| | | 0 | | 97 | 97 | | | 0.98 | 0.89 | 0.89 |
| | | ½ | 61 | 97 | 100 | | | 0.96 | 0.80 | 0.65 |
| | | 1 | | 97 | 100 | | | 0.96 | 0.76 | 0.65 |
| | | 1½ | | 97 | 100 | | | 0.96 | 0.66 | 0.59 |
| | | 2 | | 100 | 100 | 32 | 94.3 | 0.95 | 0.68 | 0.53 |
| 2 | Polyacrylic Acid $Mw = 4,322$ 4,000 ppm | Unheated | 75 | 96 | 96 | 27 | 95.5 | 1 | 1 | 1 |
| | | 0 | | 96 | 96 | | | 0.91 | 0.93 | 0.86 |
| | | ½ | 66 | 92 | 96 | | | 0.94 | 0.89 | 0.81 |
| | | 2 | | 96 | 96 | 32 | 95.9 | 0.91 | 0.89 | 0.81 |
| | | 4 | | 88 | 96 | | | 0.80 | 0.73 | 0.59 |
| 3 | Polyacrylic Acid $Mw = 3,310$ 4,000 ppm | Unheated | 52 | 80 | | 20.5 | 74.6 | 1 | 1 | 1 |
| | | 0 | 63 | 92 | | | | 0.82 | 0.93 | 0.95 |
| | | ½ | 52 | 92 | | | | 0.88 | 0.89 | 0.95 |
| | | 2 | 58 | 86 | | 23.8 | 46.7 | 0.74 | 0.90 | 0.95 |
| | | 4 | 58 | 80 | | | | 0.65 | 0.80 | 0.81 |
| 4 | Polyacrylic Acid $Mw = 14,238$ 4,000 ppm | Unheated | 46 | 71 | | 18 | 24 | 1 | 1 | 1 |
| | | 0 | 43 | 74 | | | | 0.69 | 0.83 | 0.88 |
| | | ½ | 49 | 74 | | | | 0.62 | 0.92 | 0.91 |
| | | 2 | 51 | 69 | | 10 | 10 | 0.54 | 0.84 | 0.89 |
| | | 4 | 51 | 77 | | | | 0.44 | 0.76 | 0.79 |
| 5 | Polyacrylic Acid Blend: 25 parts $Mw = 2768$ 75 parts $Mw = 8310$ 4,000 ppm Avg. $Mw = 6925$ | Unheated | 59 | 69 | | 20 | 75 | | | 1 |
| | | 2 | 69 | 90 | | 20 | 98 | | | 0.73 |
| 6 | Polyacrylic Acid Blend: 50 parts $Mw = 2768$ 50 parts $Mw = 8310$ 4,000 ppm Avg. $Mw = 5539$ | Unheated | 59 | 97 | | 38 | 100 | | | 1 |
| | | 2 | 66 | 100 | | 40 | 100 | | | 0.87 |
| | | 4 | 62 | 97 | | 42 | 100 | | | 0.80 |
| 7 | Polyacrylic Acid $Mw = 4,322$ 400 ppm | Unheated | 74 | | | 65 | 100 | | | 1 |
| | | 0 | 79 | | | 33 | 100 | | | 0.86 |
| | | 2 | 68 | | | 30 | 100 | | | 0.65 |
| | | 4 | 32 | | | 12 | 37 | | | 0.43 |
| 8 | Polyacrylic Acid Blend: 50 parts $Mw = 2768$ 50 parts $Mw = 8310$ 400 ppm Avg. $Mw = 5539$ | Unheated | 87 | 93 | | 29 | 98 | | | 1 |
| | | 0 | 97 | | | 36 | 97 | | | 0.94 |
| | | 2 | 73 | | | 34 | 100 | | | 0.74 |
| | | 4 | 87 | 90 | | 24 | 98 | | | 0.59 |

Examples 1–8—Discussion of Data

Examples 1–4

These examples show that carboxyl group and polymer mass stability after 2 hours increased with initial molecular weight, peaking at $Mw_o = 8,300$.

The molecular weight of polymer surviving after 2 hours decreases with increasing initial molecular weight.

Examples 7 and 8

Examples 7 and 8 substantiate the finding of Example 6. When the polymers are exposed to elevated temperatures and pressures at 400 ppm rather than 4,000 ppm, there is a threefold improvement in efficacy of Example 8 over Example 7.

What is claimed is:

1. A method of inhibiting the precipitation of scale forming salts, including calcium carbonate and calcium sulfate in an aqueous boiler system comprising adding to said boiler system an effective amount of a composition comprising: (a) a homopolymer of acrylic acid having a molecular weight of about 1,500 to about 3,000, as determined by gel permeation chromatography; and (b) a homopolymer of acrylic acid having a molecular weight of about 7,000 to about 15,000, as determined by gel permeation chromatography; wherein the ratio of (a):(b) is about 1:1 by weight, and wherein the weight average molecular weight of said composition ranges from about 4,000 to about 7,000.

* * * * *